United States Patent [19]

Liukko

[11] Patent Number: 4,704,092
[45] Date of Patent: Nov. 3, 1987

[54] LIFE-SAVING GARMENT AND METHOD OF MANUFACTURING THE GARMENT

[76] Inventor: Lasse Liukko, Mariankatu 16 B 18, SF-15110 Lahti 11, Finland

[21] Appl. No.: 831,062

[22] Filed: Feb. 19, 1986

Related U.S. Application Data

[63] Continuation of Ser. No. 546,865, Oct. 31, 1983, abandoned.

[51] Int. Cl.⁴ .............................................. B63C 9/08
[52] U.S. Cl. .................................. 441/104; 441/102; 441/103
[58] Field of Search .............................. 441/102–105, 441/80; 2/2.1 R; 156/251, 515

[56] References Cited

U.S. PATENT DOCUMENTS

| | | | |
|---|---|---|---|
| 1,640,270 | 8/1927 | Furman | 441/104 |
| 3,369,263 | 2/1968 | Kreckl | 441/104 |
| 3,463,150 | 8/1969 | Penfold | 2/2.1 R |
| 3,640,790 | 2/1972 | Rawley | 156/251 |
| 4,023,223 | 5/1977 | Anderson | 441/104 |
| 4,137,114 | 1/1979 | Ours | 156/251 |
| 4,214,321 | 7/1980 | Nuwayser | 156/251 |
| 4,294,242 | 10/1981 | Cowans | 441/105 |
| 4,301,791 | 11/1981 | Franco | 441/104 |
| 4,392,257 | 7/1983 | Furga | 156/251 |
| 4,497,679 | 2/1985 | Hathaway | 156/251 |

FOREIGN PATENT DOCUMENTS

2116125  9/1983  United Kingdom ............... 441/104

*Primary Examiner*—Joseph F. Peters, Jr.
*Assistant Examiner*—Clifford T. Bartz
*Attorney, Agent, or Firm*—Cohen, Pontani & Lieberman

[57] ABSTRACT

The invention relates to a life-saving garment whose material comprises a buoyant heat insulator (1), preferably an air bladder sheet, as well as to a method of manufacturing said garment. Manufacturing of life-saving garments involves a plurality of working steps, thus increasing the price of a garment. An object of the invention is to provide a simple and effective life-saving garment whose manufacturing costs are low.

The garment substantially comprises two essentially continuous, human-shaped material sheets, affixed to each other only by means of an edge joint (2). One side of the garment is provided with a watertight zipper (3) as well as with a face opening (4), adapted to prevent water from flowing in the opening. The garment preferably consists of two suits placed one inside the other, the top suit being turned inside out, said joints (2) of the suits being confined in an air space (5) between the suits. The life-saving garment is manufactured by affixing to each other two superimposed webs of a heat insulating material, preferably air bladder sheets, preferably by hot welding by means of a die or the like with a continuous edge joint (2), the entire garment being made in a single step into a human shape, preferably by a single depression of said die.

4 Claims, 5 Drawing Figures

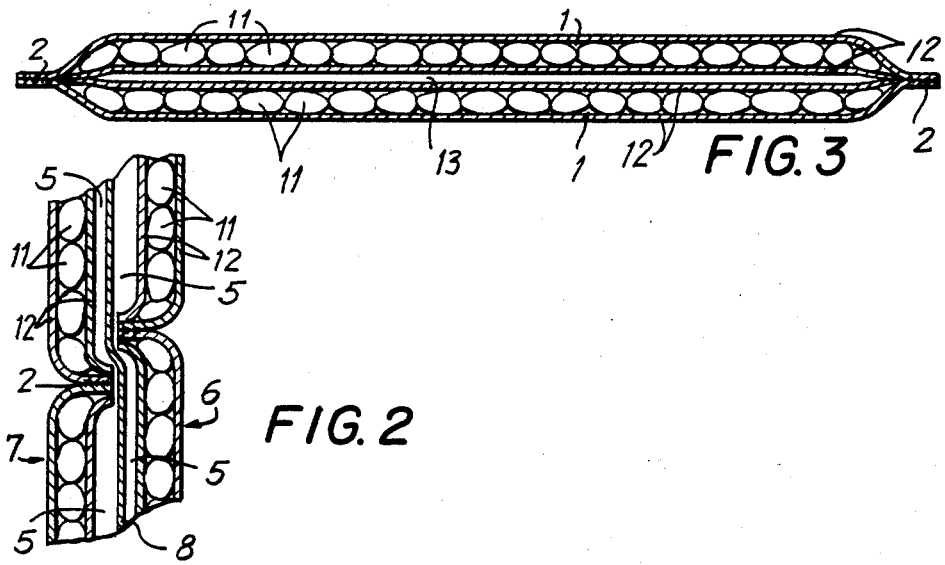
FIG. 3
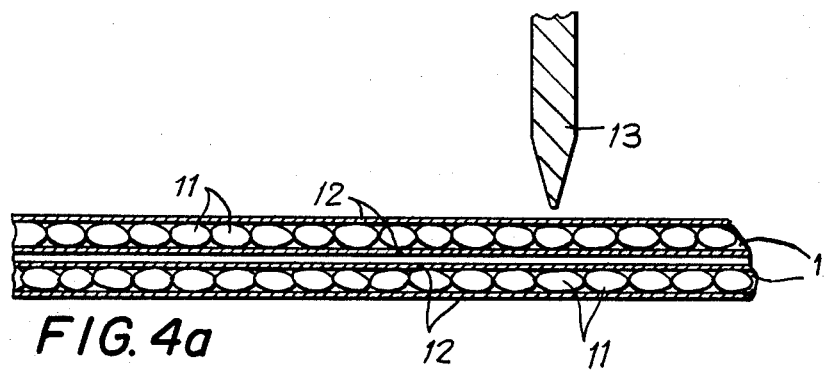
FIG. 2
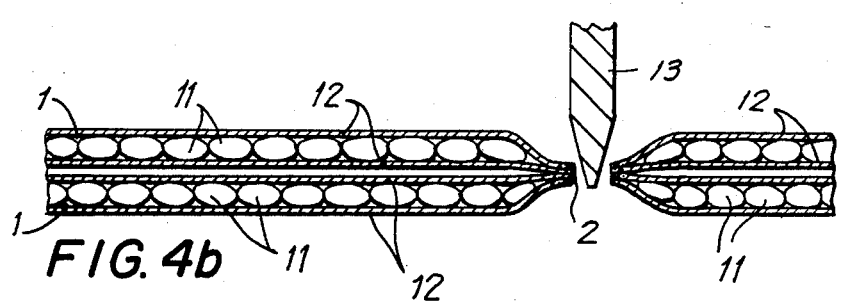
FIG. 4a
FIG. 4b

LIFE-SAVING GARMENT AND METHOD OF MANUFACTURING THE GARMENT

This is a continuation of U.S. application Ser. No. 546,865, filed Oct. 31, 1983, now abandoned.

The present invention relates to a life-saving outfit or garment whose material comprises some buoyant heat insulator. The invention also relates to a method of manufacturing said life-saving garment.

If a person gets wet in his normal set of clothing and is exposed to hard wind or cold water, a human body will suffer from severe heat losses and the vital functions weaken very quickly. For example, water chills the body 25 times faster than air. When water temperature is from 0° C. to 5° C., exhaustion and unconsciousness will begin within 15 to 30 minutes and death will follow in 30 to 90 minutes. The studies and tests performed all over the world have clearly indicated that an insulated dry suit is best protection against death by freezing.

Life-saving garments are intended for prolonged flotation in water and they are generally made of a bilaterally laminated closed cell material. The foot sections in such garments are rather large keeping the feet well on the surface and warm but movements are clumsy and the glove section of such garments is of simple design. Life-saving garments are quite complicated structures and various sections are joined together by means of seams or the like.

Life-saving garments can be fitted with a plurality of various insulating layers under the surface material, depending mostly on the intended application of a garment. Manufacturing costs are the most important factor to prevent the introduction of such garments, since the manufacturing of even simple life-saving garments involves a plurality of working steps that naturally increase the price of a garment.

An object of the invention is to provide a life-saving garment which eliminates some of the drawbacks involved in the manufacture of life-saving garments. A further object is to provide a method whereby a simple, effective and inexpensive life-saving garment is obtained.

As for the characterizing features of the invention, reference is made to the annexed claims.

A garment of the invention comprises two substantially continuous man-shaped material sheets or skins, joined together just by an edge joint. Thus, the heat insulator that serves as material yields to some extent to a person's movements, although there are no actual seams e.g. in hand and foot sections. The assembly is relatively stiff but, after all, it is intended to serve mainly as a life-saving garment having sufficient heat insulation capacity and buoyancy. One side of the garment is provided with a watertight zipper as well as a face opening adapted to stop water from coming in through said opening. The zipper is adapted to facilitate dressing as quickly and readily as possible.

The buoyant heat insulating material preferably comprises an entire garment covering air bladder membrane consisting of air bladders affixed to the membrane and positioned immediately adjacent to each other. This type of buoyant heat insulator that contains more air than material is highly heat insulative and buoyant. Furthermore, its durability properties are good. This garment preferably comprises two suits one inside the other, the top suit being inside out and placed upon the other. Thus, the seams in such suits remain within the air space between the suits, both the external and internal surface of a garment thus becoming seamless which eliminates the possibility of seams getting stuck somewhere and tearing. In addition, a two-layer garment offers good protection against cold. Also the buoyancy properties of such a garment are good. If desired, the outer and inner layers of a life-saving garment are provided with a different material. In addition and if desired, it is possible to arrange between the two suits placed one inside the other some heat reflecting material, preferably an aluminium foil, that reflects the body heat back to the body and similarly the heat radiation of cold water or air back to the water.

A life-saving garment of the invention is manufactured by fixing together two superimposed webs of heat insulating material, preferably an air bladder membrane. The affixing is preferably effected by hot welding by means of a die or the like, the entire garment being made at once into the human shape preferably by a single depression of said die.

The die joins two edges together only by a continuous edge joint that conforms to a human body. Produced in a single working step is thus a single-layer suit, one side of which is provided with an opening for a face and with a slit for a zipper. The zipper is affixed to be watertight and the face opening is adapted to prevent water from entering therein. Obtained thus is a simple, inexpensive and effective life-saving garment. The garments can be manufactured in a plurality of sizes, including children's sizes whose manufacturing has heretofore been expensive. If a thicker insulation layer is required, the garment is turned inside out and placed on top of another suit or garment. Obtained now is a double structure with an air space therebetween. In this case, also the seams of said suits remain within said air space between the suits and do not hamper the use of this garment. Such a garment is highly buoyant and offers effective insulation against the cold since the garment design includes two air bladder membranes and and air space therebetween. All these factors buoy and insulate a human being effectively.

The heat insulating materials affixed to each other by an edge joint are preferably removed from material webs at the joints or immediately adjacent thereto by means of a die that has been used to form the joint. Of course, it is also possible to cut off or remove from material webs human-shaped sheets of a desired size and to affix these to each other after the cutting by means of edge joints.

The invention will now be explained with reference made to the accompanying drawing, in which:

FIG. 2 is a cross-sectional view of a life-saving or rescue suit according to the invention formed of a nested double layer of heat insulating material;

FIG. 3 is a cross-sectional view taken along the lines 3—3 in FIG. 1 of a rescue suit in accordance with the invention formed of a single layer of heat insulating material; and FIGS. 4A and 4B illustrate in cross-section the inventive method of manufacturing the rescue suit of the invention with a cut-weld die.

Figure 1:
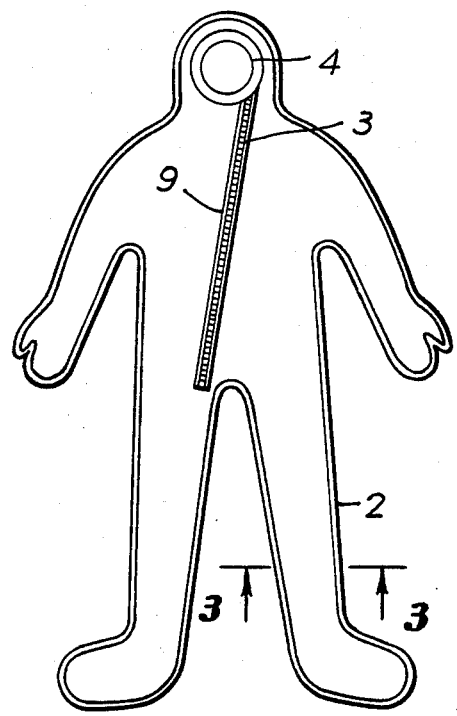
FIG. 1 shows a life-saving garment of the invention in elevation.

A life-saving garment shown in FIG. 1 comprises two substantially uniform, human-shaped material sheets that are attached to each other only by an edge joint 2. The garment material comprises an air bladder membrane or sheet 1 which is a resilient and buoyant heat insulator. One side of the garment is fitted with a water-tight zipper 3 which is affixed to a reinforcement strip 9, preferably made of PVC-plastics. The same side of the garment is provided with a face opening 4, adapted to prevent water from seeping in through said opening.

In FIGS. 2 to 4B, the heat insulating material layers 1 consist of an air bladder membrane having two plastic material (e.g. polyethylene) layers 12 and air bubbles or bladders 11 formed of a plastic material such as polyethylene therebetween.

Referring now to FIG. 3, a seam section 2, wherein the seams are directed outwards, is cross-sectionally illustrated. Here, each skin surface of the rescue suit is formed of only a single heat insulating material layer 1. In use, a person's leg is pushed or inserted into the leg part of the suit, i.e. into the space 13 defined between the front and back surface layers 1 of the rescue suit.

In FIG. 2, on the other hand, the skin of the rescue suit comprises a double or two heat insulating material layers -- namely, inner layer 1a and top or outer layer 1b. During manufacture of the suit, the layers 1a and 1b are placed in nested fashion one inside the other, the top layer 1b being turned inside out prior to receiving inner layer 1a therewithin and the hot weld joints 2 of the both said layers thus being confined within an air space 5 defined between the inner and outer layers of heat insulating material. A heat reflecting material 8, preferably an aluminum foil, is inserted into air space 5. The internal surface of the garment is fitted with an inner layer 6 of a dressing-facilitating light-weight and water-resistant fabric, preferably polyamide. The external surface of the garment is provided with an outer layer 7 of a water-insulating, fluorinated material, preferably a polyester fabric bilaterally coated with PVC-plastics. The garment is provided with one zipper 3 whose reinforcement strip 9 is affixed to both the inner and outer layer of said garment or with two zippers 3, affixed in a manner that one is attached to the internal garment section and the other to the external garment section.

A garment as set out in FIG. 1 is made of two superimposed air bladder sheets by affixing the sheets together by means of a continuous edge joint. The joints or seams are preferably affixed by hot welding by means of a die or the like and a garment is cut off the material webs. Thereafter, one side of the garment is provided with an opening 4 for the face and with a slit for zipper 3.

Thus, referring to FIG. 4A, two insulating layers 1 are seen superimposed one atop the other with a movable heated cutting and hot seam welding die 13 approaching the layers. In FIG. 4B, the die 13 is shown pressed against the two layers, creating a hot welding seam and cutting the material layers. The edge of the die 13 has a human-shaped contour, resulting in the human-contour-shaped continuous and uninterrupted seam 2 illustrated in FIG. 1, and the entire heat insulating layer of the rescue suit is accordingly readily and conveniently manufactured by a single reciprocated depression of the die.

When manufacturing a single-layer garment, the face opening is fitted with a protector or screen to prevent water from flowing in the opening, followed by affixing a zipper reinforcement strip and a zipper to the slit made therefor.

When manufacturing a twofold or double garment, a garment or suit is turned inside out. This way is produced a double structure with an air space therebetween and the seams of both suits will be confined in the air space between the suits. A face opening 4 is provided to prevent water from flowing in the opening or into the space between the layers.

The invention is no way limited to the above-described embodiments but modifications thereof are conceivable within the scope of the inventive idea defined in the annexed claims. If desired, it is e.g. possible to manufacture garments having more than two layers in a similar manner.

I claim:

1. A flexible life-saving garment, comprising:
   a first pair of buoyant, flexible heat insulating material layers (1), each formed of at least two heat insulator flexible layers (12) and a plurality of adjacently disposed, permanently inflated air bladders (11) disposed between said flexible layers (12);
   a water-tight zipper and a face opening in one of said material layers (1);
   a single, continuous and uninterrupted human-contour-shaped first edge seam (2) permanently and nonreleasably joining said material layers along their peripheral edges to form a substantially closed life-saving garment for water-tightly enveloping a human body between said joined heat insulating material layers (1);
   a second pair of buoyant flexible heat insulating material layers(1), each formed of at least two heat insulator flexible layers (12) and a plurality of adjacently disposed, permanently inflated air bladders (11) disposed between said flexible layers (12);
   a single, continuous and uninterrupted human-contour-shaped second edge seam (2) permanently and nonreleasably joinint said second material layers; and
   an opening in at least one of said material layers (1) of said second pair of material layers;
   said joined pair of second flexible material layers being turned inside out and receiving nestedly therewithin said joined pair of first flexible material layers such that said first edge seam and said second edge seam are confined within an air space defined between said joined pairs of said first and second flexible material layers.

2. A flexible lifesaving garment in accordance with claim 1, further comprising a heat reflecting material (8) disposed between said first and second joined pairs of flexible heat insulating material layers (1).

3. A flexible lifesaving garment in accordance with claim 2, said heat reflecting material being an aluminum foil.

4. A flexible lifesaving garment in accordance with claim 1, further comprising a water-tight external garment layer (7) on one material layer (1) of said second pair thereof, and an interior garment layer on one material layer (1) of said first pair thereof.

* * * * *